(12) United States Patent
Koshy et al.

(10) Patent No.: US 12,461,132 B2
(45) Date of Patent: Nov. 4, 2025

(54) TECHNIQUES FOR DETERMINING A RESISTANCE OF ELECTRICAL CONDUCTORS PROVIDING ELECTRICAL POWER TO A RADIO

(71) Applicant: Outdoor Wireless Networks LLC, Richardson, TX (US)

(72) Inventors: Rajiv Koshy, Murphy, TX (US); David Barkman, Jr., Otego, NY (US); Willis James, Wylie, TX (US)

(73) Assignee: Outdoor Wireless Networks LLC, Richardson, TX (US)

( * ) Notice: Subject to any disclaimer, the term of this patent is extended or adjusted under 35 U.S.C. 154(b) by 0 days.

(21) Appl. No.: 19/049,923

(22) Filed: Feb. 10, 2025

(65) Prior Publication Data
US 2025/0271477 A1   Aug. 28, 2025

Related U.S. Application Data

(60) Provisional application No. 63/558,901, filed on Feb. 28, 2024.

(51) Int. Cl.
*G01R 27/08* (2006.01)
*H02M 1/00* (2007.01)

(52) U.S. Cl.
CPC ........... *G01R 27/08* (2013.01); *H02M 1/0009* (2021.05)

(58) Field of Classification Search
CPC ........ G01R 27/00; G01R 27/02; G01R 27/08; H02M 1/00; H02M 1/0003; H02M 1/0009
USPC .................................. 324/600, 649, 691, 713
See application file for complete search history.

(56) References Cited

U.S. PATENT DOCUMENTS

| | | | |
|---|---|---|---|
| 6,448,780 B1 * | 9/2002 | Jurisch | G01R 27/16 324/525 |
| 8,823,402 B2 * | 9/2014 | Vladan | G01R 27/08 324/525 |
| 10,281,939 B2 | 5/2019 | Chamberlain et al. | |
| 10,821,664 B2 | 11/2020 | Schick et al. | |
| 11,304,132 B2 | 4/2022 | Coleman et al. | |
| 2018/0270750 A1 * | 9/2018 | Coleman | H04B 1/1607 |
| 2021/0144635 A1 * | 5/2021 | Coleman | H02H 9/04 |

(Continued)

FOREIGN PATENT DOCUMENTS

| | | |
|---|---|---|
| KR | 101319989 B1 | 10/2013 |
| KR | 102180517 B1 | 11/2020 |
| WO | 2022187095 A1 | 9/2022 |

OTHER PUBLICATIONS

International Searching Authority, "International Search Report and Written Opinion", dated May 28, 2025, from PCT Application No. PCT/US2025/015288, from Foreign Counterpart to U.S. Appl. No. 19/049,923, pp. 1 through 9, Published: WO.

*Primary Examiner* — Hoai-An D. Nguyen
(74) *Attorney, Agent, or Firm* — Fogg & Powers LLC

(57) ABSTRACT

Techniques are provided for automatically determining when voltage and current levels occur when a DC input of a radio is drawing substantially constant power through electrical conductors from a DC voltage converter. Such voltage and current level occurring when such power draw is substantially constant can then be used to determine a resistance of the electrical conductors. Subsequently, the resistance can be used to vary an output voltage of the DC voltage converter when the power draw, and thus the direct current drawn through the electrical conductors, varies.

21 Claims, 4 Drawing Sheets

(56) References Cited

U.S. PATENT DOCUMENTS

2023/0367343 A1    11/2023  Chamberlain et al.
2024/0133933 A1*    4/2024  Al-Mufti ............. H02M 1/0048
2024/0418756 A1*   12/2024  Mayer .................... G05B 15/02

* cited by examiner

TECHNIQUES FOR DETERMINING A RESISTANCE OF ELECTRICAL CONDUCTORS PROVIDING ELECTRICAL POWER TO A RADIO

CROSS-REFERENCE TO RELATED APPLICATIONS

The present application claims benefit of U.S. Patent Application Ser. No. 63/558,901 filed Feb. 28, 2024; the entire contents of the aforementioned patent application are incorporated herein by reference as if set forth in its entirety.

BACKGROUND

A direct current (DC)-DC voltage converter may be used to boost its output voltage to diminish power dissipation in electrical conductors coupling an output of the DC-DC voltage converter to a DC power input of a radio. The DC-DC voltage converter provides DC electrical power to the radio through the electrical conductors. U.S. Pat. No. 10,281,939 (hereinafter the '939 patent) describes different embodiments of voltage converter systems configured to accomplish this. The '939 patent is incorporated by reference herein in its entirety.

As also described in the '939 patent, the DC-DC voltage converter may be used in some embodiments to maintain a substantially constant DC voltage at the DC power input of the radio notwithstanding direct current drawn by the radio through its DC power input. In some of these embodiments described in the '939 patent, resistance of the electrical conductors must be known to facilitate such regulation. U.S. Pat. No. 11,304,132 is also incorporated by reference herein in its entirety.

In some embodiments, such resistance or parameters from which the resistance can be derived may be entered into an apparatus including the DC-DC voltage converter. This approach is labor intensive and may be prone to error.

In other embodiments, the resistance may be automatically determined based on current and voltage measurements. In such case, a power consumption of the radio must remain constant. This can be facilitated in different ways, for example, by disabling a radio's reception and transmission, when electrical conductors' resistance is determined. This requires complex interaction with the radio.

SUMMARY

In some aspects, the techniques described herein relate to a method for determining a resistance of electrical conductors through which electrical power is provided by a direct current (DC) voltage converter to a DC power input of a radio, wherein the electrical conductors have converter ends and radio ends, and wherein output current flows from the converter ends to the radio ends, the method including: obtaining a maximum representation of dispersion of the output current; setting an output voltage to an output voltage level; obtaining at least one measured radio ends voltage level and more than one measured output current levels; determining a representation of dispersion of the more than one measured output current levels; determining whether the representation of dispersion of the more than one measured output current levels is within the maximum representation of dispersion of the output current; and determining that the representation of dispersion of the more than one measured output current levels is within the maximum representation of dispersion of the output current, then using a representation of a radio end voltage level, the output voltage level, and a representation of the more than one measured output current levels, determining the resistance of the electrical conductors.

In some aspects, the techniques described herein relate to a non-transitory computer readable medium storing a program causing at least one processor to execute a process for determining a resistance of electrical conductors through which electrical power is provided by a direct current (DC) voltage converter to a DC power input of a radio, wherein the electrical conductors have converter ends and radio ends, and wherein output current flows from the converter ends to the radio ends, the process including: obtaining a maximum representation of dispersion of the output current; causing an output voltage to be set to an output voltage level; obtaining at least one measured radio ends voltage level and more than one measured output current levels; determining a representation of dispersion of the more than one measured output current levels; determining whether the representation of dispersion of the more than one measured output current levels is within the maximum representation of dispersion of the output current; and determining that the representation of dispersion of the more than one measured output current levels is within the maximum representation of dispersion of the output current, then using a representation of a radio end voltage level, the output voltage level, and a representation of the more than one measured output current levels, determining the resistance of the electrical conductors.

In some aspects, the techniques described herein relate to an apparatus for determining a resistance of electrical conductors through which electrical power is provided by a direct current (DC) voltage converter to a DC power input of a radio, wherein the electrical conductors have converter ends and radio ends, and wherein output current flows from the converter ends to the radio ends, the apparatus including: processing circuitry; and at least one DC voltage converter communicatively coupled to the processing circuitry; wherein each DC voltage converter includes a DC-DC voltage converter electrically coupled to a current sensor configured to measure direct current flowing through an output of the DC voltage converter; wherein the processing circuitry is configured to: obtain a maximum representation of dispersion of the output current; cause an output voltage of a DC voltage converter to be set to an output voltage level; obtain more than one measured output current levels from the current sensor of the DC voltage converter and at least one measured radio ends voltage level; determine a representation of dispersion of the more than one measured output current levels; determine whether the representation of dispersion of the more than one measured output current levels is within the maximum representation of dispersion of the output current; and determine that the representation of dispersion of the more than one measured output current levels is within the maximum representation of dispersion of the output current, then using a representation of a radio end voltage level, the output voltage level, and a representation of the more than one measured output current levels, determine the resistance of the electrical conductors.

In some aspects, the techniques described herein relate to a method for determining a resistance of electrical conductors through which electrical power is provided by a direct current (DC) voltage converter to a DC power input of a radio, wherein the electrical conductors have converter ends and radio ends, and wherein output current flows from the converter ends to the radio ends, the method including: obtaining a maximum representation of dispersion of a test output current; setting a test output voltage at an output of the of the DC voltage converter; when the test output voltage is set at the output of the DC voltage converter, measuring a test output current flowing from the output of the DC voltage converter; setting at least one non-test output voltage at the output of the DC voltage converter and measuring a corresponding non-test output current at each non-test output voltage and flowing from the output of the DC voltage converter; again setting the test output voltage at the output of the DC voltage converter; when the test output voltage is set at the output of the DC voltage converter, measuring another test output current flowing from the output of the DC voltage converter; determining a representation of dispersion of a set of test output currents; determining whether the representation of dispersion of the set of the test output currents is within the maximum representation of dispersion of the test output current; and determining that the representation of dispersion of the set of test output currents is within the maximum representation of dispersion of the test output current, then, using at least two voltage and current pairs, wherein each voltage and current pair includes an output voltage at the output of the DC voltage converter and an output current occurring at the output voltage and flowing from the output of the DC voltage converter, determining the resistance of the electrical conductors, wherein at least one voltage and current pair is a non-test output voltage and a corresponding non-test output current at the non-test output voltage.

In some aspects, the techniques described herein relate to a non-transitory computer readable medium storing a program causing at least one processor to execute a process for determining a resistance of electrical conductors through which electrical power is provided by a direct current (DC) voltage converter to a DC power input of a radio, wherein the electrical conductors have converter ends and radio ends, and wherein output current flows from the converter ends to the radio ends, the process including: obtaining a maximum representation of dispersion of a test output current; causing a test output voltage to be set at an output of the DC voltage converter; when the test output voltage is set at the output of the DC voltage converter, measuring a test output current flowing from the output of the DC voltage converter; causing at least one non-test output voltage to be set again at the output of the DC voltage converter and measuring a corresponding non-test output current at each non-test output voltage and flowing from the output of the DC voltage converter; causing the test output voltage to again be set at the output of the DC voltage converter; when the test output voltage is set at the output of the DC voltage converter, measuring another test output current flowing from the output of the DC voltage converter; determining a representation of dispersion of a set of test output currents; determining whether the representation of dispersion of the set of the test output currents is within the maximum representation of dispersion of the test output current; and determining that the representation of dispersion of the set of test output currents is within the maximum representation of dispersion of the test output current, then, using at least two voltage and current pairs, wherein each voltage and current pair includes an output voltage at the output of the DC voltage converter and an output current occurring at the output voltage and flowing from the output of the DC voltage converter, determining the resistance of the electrical conductors, wherein at least one voltage and current pair is a non-test output voltage and a corresponding non-test output current at the non-test output voltage.

In some aspects, the techniques described herein relate to an apparatus for determining a resistance of electrical conductors through which electrical power is provided by a direct current (DC) voltage converter to a DC power input of a radio, wherein the electrical conductors have converter ends and radio ends, and wherein output current flows from the converter ends to the radio ends, the apparatus including: processing circuitry; at least one DC voltage converter communicatively coupled to the processing circuitry; and wherein each DC voltage converter includes a DC-DC voltage converter electrically coupled to a current sensor configured to measure direct current flowing through an output of the DC voltage converter; wherein the processing circuitry is configured to: obtain a maximum representation of dispersion of a test output current; cause a test output voltage to be set at the output of the DC voltage converter; when the test output voltage is set at the output of the DC voltage converter, measure a test output current flowing from the output of the DC voltage converter; cause at least one non-test output voltage to be set to a non-test output voltage level and measuring a corresponding non-test output current at each non-test output voltage level and flowing from the output of the DC voltage converter; cause the test output voltage to be set again at the output of the DC voltage converter; when the test output voltage is set at the output of the DC voltage converter, measure another test output current flowing from the output of the DC voltage converter; determining a representation of dispersion of a set of test output currents; determine whether the representation of dispersion of the set of the test output currents is within the maximum representation of dispersion of the test output current; and determining that the representation of dispersion of the set of test output currents is within the maximum representation of dispersion of the test output current, then, using at least two voltage and current pairs, wherein each voltage and current pair includes an output voltage at the output of the DC voltage converter and an output current occurring at the output voltage and flowing from the output of the DC voltage converter, determining the resistance of the electrical conductors, wherein at least one voltage and current pair is a non-test output voltage and a corresponding non-test output current at the non-test output voltage.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
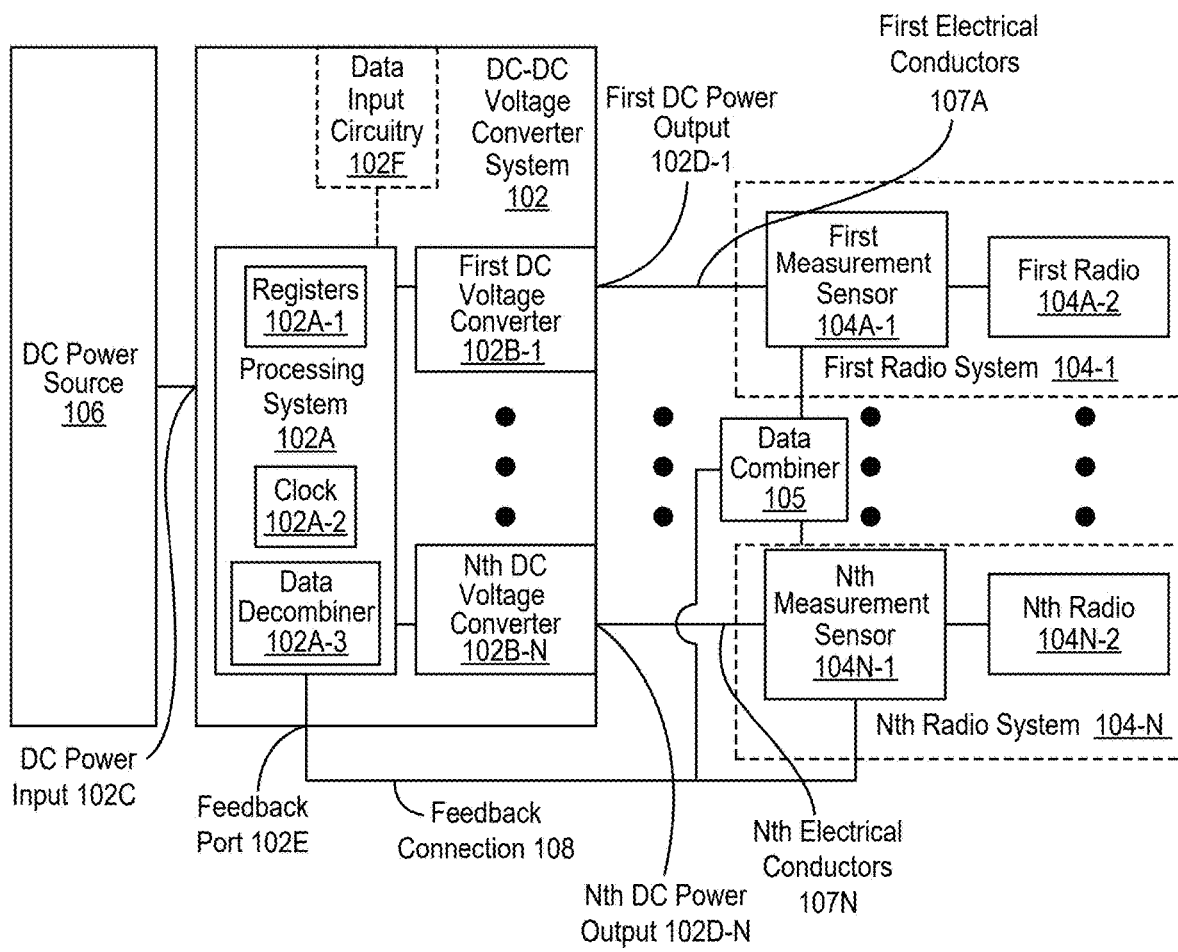
FIG. 1 illustrates a block diagram of one embodiment of a DC-DC voltage converter system configured to implement the first embodiment of the invention.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical, and electrical changes may be made without departing from the scope of the present invention. The following detailed description is, therefore, not to be taken in a limiting sense.

Techniques are provided for automatically determining a resistance of electrical conductors using measured voltage and current levels. Embodiments of the invention can be executed by an apparatus, e.g., a voltage booster including DC voltage converter(s), automatically determine such resistance in an operating mode of a radio, e.g., a start up or receive only operating mode of the radio, when a radio's DC power consumption is substantially constant and which occurs prior to normal radio operation, i.e., when the radio both transmits and receives information. Optionally, embodiments of the invention can be performed until the resistance of the electrical conductors have been determined.

Embodiments of the invention are improvements to techniques for determining a resistance of electrical conductors electrically coupling a DC voltage converter to a radio. Such embodiments of the invention improve accuracy of resistance determination by ensuring voltage and current values are used only when such voltage and current values occur when a DC power input of the radio is drawing a substantially constant amount of power.

In a first embodiment, a resistance of the electrical conductors is determined based on measurements of (a) voltages at (i) an output of the DC voltage converter electrically connected to converter ends of the electrical conductors and (i) the radio ends of the electrical conductors which are electrically connected to the DC power input of the radio, and (b) a direct current levels drawn from the output of the DC voltage converter by the DC power input of the radio.[1] Measurement data is used only used to determine the resistance of the electrical conductors when the DC power drawn by the DC power input of the radio is constant when such data is measured.

[1] For purposes of clarity, direct current flows from the output of the DC-DC voltage converter, through the power supply ends of the electrical conductors, then through the radio ends of the electrical conductors, and then into the DC power input of the radio.

In a first embodiment, the resistance of the electrical conductors, REC, is:

$$(V_O - V_{RE})/I_O,$$

where $V_{RE}$ is a representation of a voltage at the radio ends of the electrical conductors, $V_O$ is the voltage at the output of the DC voltage converter, and $I_O$ is a representation of the current drawn from the output of the DC-DC voltage converter. As discussed elsewhere herein, such voltage and current values may be a single value based on measurement or setting or a statistical measure of central tendency. The DC voltage converter obtains, periodically and/or optionally aperiodically, each of the voltage and current levels. The DC voltage converter determines if DC power consumption drawn by a radio is substantially constant by determining that for a first time period that the current drawn from the output of the DC voltage converter is within a current range and/or whether a DC voltage at the radio ends is within a voltage range. Only upon determining that a DC power consumption of a radio is substantially constant during the first time period does the DC voltage converter determine the resistance of the electrical conductors using one or more sets of the voltages and the current, e.g., measured during the first time period. The DC power consumption of the radio is substantially constant if each output voltage, $V_O$ of the DC voltage converter, e.g., measured during the first time period, is within a maximum representation of dispersion of the output voltage and/or if each output current, $I_O$, of the DC voltage converter is within a maximum representation of dispersion of the output current. Each maximum representation of dispersion describe herein can be a variance, a standard deviation, a numerical range, or any other parameter(s) characterizing dispersion.

In a second embodiment and as further described in the '939 patent, the resistance of the electrical conductors is determined based on pairs of a voltage at the output of DC voltage converter (or output voltage) and a current level drawn from the output of the DC voltage converter (or output current). Each voltage and current level of a pair is measured at about the same time or time period. The output voltage, and thus the output current, of at least two pairs, e.g., of all pairs, are different. Pairs of data are used only used to determine the resistance of the electrical conductors when the DC power drawn by a DC power input of a radio is constant, e.g., substantially constant, when such data of such pairs is obtained.

In this second embodiment, the resistance of the electrical conductors, Rec, is:

$$\sum_{n=1}^{n=X'} [(V_{O,n+1} * I_{O,n+1} - V_{O,n} * I_{O,n})/(I_{O,n+1}^2 - I_{O,n}^2)]/X',$$

where $V_{O,n}$ is an output voltage of a nth pair measured during a nth time or time period, $I_{O,n}$ is an output current measured during the nth time or time period, $V_{O,n+1}$ is an output voltage $V_O$ measured during an n+1 time or time period, $I_{O,n+1}$ is an output current $I_O$ measured during the n+1 time period, and X' is a number of pairs output voltages and output currents. Each of the X' pairs have different voltage and current levels. The DC voltage converter obtains, periodically and/or optionally aperiodically, each pair of the voltage and current levels. The DC voltage converter determines if DC power consumption drawn by a radio is substantially constant for a time period as follows. Firstly, the output voltage is set at least twice during the time period to a same voltage level (e.g., a test voltage) and which provides a same measured output current level (test current level) for each such setting. Secondly, a representation of dispersion of output current drawn from the output of the DC voltage converter is determined. Thirdly, whether a representation of dispersion of the current drawn from the output of the DC voltage converter is within the maximum representation of dispersion of the output current is determined. Fourthly, when the representation of dispersion of the output current is within the maximum representation of dispersion of the output current, then the resistance of the electrical conductors is determined by using at least two pairs of output voltage and output current, where each of the output voltage and the output current differ between at least two pairs.

FIG. 1 illustrates a block diagram of one embodiment of a DC-DC voltage converter system 102 configured to implement the first embodiment of the invention. The DC-DC voltage converter system 102 includes a processing system (or processing circuitry) 102A, N DC-DC voltage converters 102B-1, 102B-N, a DC power input 102C, N DC power outputs 102D-1, 102D-N, and an optional feedback port 102E. N is an integer greater than one.

Each of the N DC power outputs 102D-1, 102D-N is a DC power output of a unique DC-DC voltage converter, and thus of the DC-DC voltage converter system 102. Each DC-DC voltage converter 102B-1, 102B-N is configured to establish the DC voltage at a corresponding DC power output 102D-1, 102D-N. Optionally, each DC-DC voltage converter 102B-1, 102B-N is a boost converter or a buck-boost converter.

The DC power input 102C is configured to be electrically coupled to a DC power source 106. The DC power source 106 is configured to provide DC electrical power to the DC-DC voltage converter system 102, through the DC power input 102C. The DC electrical power, provided by the DC power source 106, has a DC power source voltage level, e.g., −54 volts DC (VDC) which is also provided to the DC power input 102C of the DC-DC voltage converter system 102. Optionally, the DC power source voltage level is provided to an input of each DC-DC voltage converter 102B-1, 102B-N of the DC-DC voltage converter system 102. Optionally, the DC power source 106 includes an alternating current (AC) to direct current (DC) (AC/DC) power supply, at least one battery, at least one solar cell, and/or any other type of DC power source.

Each DC-DC voltage converter 102B-1, 102B-N and the optional feedback port 102E are electrically coupled to the processing system 102A. Each ith DC-DC voltage converter 102B-1, 102B-N is electrically connected to an ith DC power output. Each jth DC power output is configured to be coupled through jth electrical conductors to an optional jth measurement sensor and a jth radio. Optionally, each coupled pair of optional measurement sensor 104A-1, 104A-N and radio 104A-2, 104A-N may be part of a radio system, e.g., a first radio system 104-1 and an Nth radio system 104-N. Optionally, a radio system includes an enclosure that includes a measurement sensor and a radio.

Each optional measurement sensor is configured to measure a DC electrical parameter value, e.g., a DC voltage level; thus, optionally, an optional measurement sensor may be a voltage sensor. The optional measurement sensor may also be referred herein as an optional measurement circuitry. For pedagogical reasons, each optional measurement sensor 104A-1, 104N-1 is illustrated in FIG. 1 as being serially electrically coupled between electrical conductors 107A, 107N and a radio 104A-2, 104N-2; however, alternatively, if the optional measurement sensor is a magnetically coupled current sensor, such as a Hall effect sensor, the measurement sensor is magnetically coupled, e.g., to the electrical conductors 107A, 107N and is not serially electrically coupled as illustrated.

For pedagogical purposes, FIG. 1 illustrates an optional single feedback port 102E. An optional single feedback connection 108 communicatively couples measurement data from each optional measurement sensor 104A-1, 104N-1 to a single, i.e., physical, feedback port 102E. The optional single feedback connection 108 may be a wired or wireless connection configured to convey analog or digital data. Optionally, measurement data, measured substantially at the same time by each optional measurement sensor 104A-1, 104N-1, may be conveyed in a serial and/or a parallel data interface format through the single feedback connection 108. Optionally, when data is conveyed serially through the optional single feedback connection 108, an IEEE RS-485 protocol is used.

The DC-DC voltage converter system 102 illustrated in FIG. 1 includes an optional data combiner (data combiner circuit) 105 and data decombiner (or data decombiner circuit) 102A-3. The optional data combiner 105 is configured to be located remote from the DC-DC voltage converter system 102 and proximate to, e.g., at, the optional measurement sensors 104A-1, 104N-1. The optional data combiner 105 combines, serially and/or in parallel, measurement data measured by each measurement sensor 104A-1, 104N-1 at substantially the same time, and transmits the measurement data, measured at substantially the same time and combined serially and/or in parallel, through the feedback connection 108. Optionally, the optional data combiner 105 need not be used; data outputs of each optional measurement sensor may optionally be serially daisy chained one to another.

For pedagogical purposes, the optional data decombiner 102A-3 is illustrated as part of the processing system 102A; however, the optional data decombiner 102A-3 may be located outside of the processing system 102A. The optional data decombiner 102A-3 is configured to extract measurement data measured by each optional measurement sensor 104A-1, 104N-1 at substantially the same time and combined serially or in parallel. Although the DC-DC voltage converter system 102 comprises an optional single physical feedback port 102E, the output of the optional data decombiner 102A-3 may be considered to comprise a set of logical feedback ports equivalent to more than one physical feedback port. Measured (or measurement) data received from a unique measurement sensor and provided by the output of the optional data decombiner 102A-3 corresponds to a unique logical feedback port of the set of logical feedback ports. Each logical feedback port corresponds to a unique relative time or an electrical output (e.g., a set of electrical conductors) of the data decombiner 102A-3. Such relative times or electrical outputs may be designated by a system designer and/or system user. For example, the first measurement data (for a measurement period) of data provided serially or in parallel may be associated with a first time slot or a first electrical output, the second measurement data (for the measurement period) may be associated respectively with a second time slot or a second electrical output, etc.; however, other arbitrary combinations may be utilized. Thus, each logical feedback port corresponds to a unique, optional measurement sensor and provides data from such unique, optional measurement sensor.

Alternatively, the DC-DC voltage converter system 102 may include more than one optional feedback port. Optionally, the DC-DC voltage converter system 102 may include N optional feedback ports each of which are communicatively coupled through a unique, optional feedback connection 108 to a unique measurement sensor. Each such optional feedback port is a physical feedback port.

The DC-DC voltage converter system 102 optionally includes data input circuitry 102F electrically coupled to the processing system 102A. Optionally, the optional data input circuitry 102F includes an input/output interface (e.g., a touch screen) and/or a receiver (or transceiver) (e.g., configured for a wide area network, a local area network, and/or a personal area network) configured to receive externally provided data from an external computing system, e.g., a mobile telephone, a tablet, or any remote computing system. The optional data input circuitry 102F is optionally configured to receive, e.g., from the installer and/or the network operator, a time period and/or electrical parameter range(s) used to determine whether DC power drawn from the output of the DC voltage converter is substantially constant.

The processing system 102A may be any type of computational system, e.g., a state machine, neural network, and/or another type of computational system. In one embodiment, processing system 102A comprises a processor circuitry electrically coupled to memory circuitry. The processing system 102A optionally includes registers 102A-1, e.g., of the memory circuitry. Optionally, the processing system 102A includes a clock 102A-2 configured to keep time. Optionally, the determined resistance of each of the electrical conductors is configured to be stored in a unique one of the optional registers 102A-1.

For purposes of clarity, embodiments of the invention, e.g., the second embodiment discussed elsewhere herein, may be implemented with a version of the apparatus illustrated in FIG. 1 that excludes each optional measurement sensor 104A-1, 104N-1, the optional data combiner 105, the optional feedback connection(s), and the optional feedback port(s).

Figure 2:
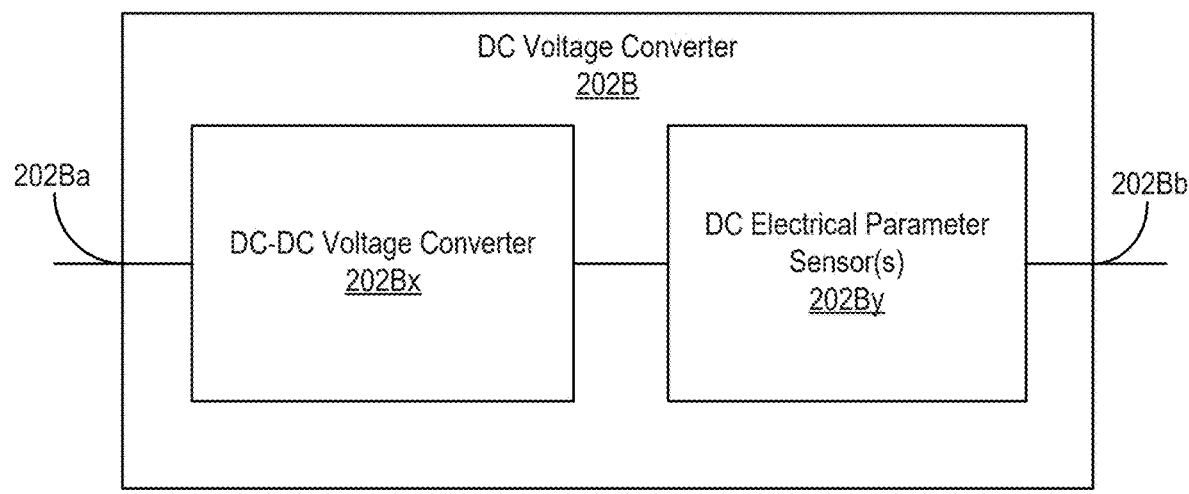
FIG. 2 illustrates a block diagram of one embodiment of a DC voltage converter.

FIG. 2 illustrates a block diagram of one embodiment of a DC voltage converter 202B. Optionally, the illustrated DC voltage converter may be used to implement the DC voltage converters 102B-1, 102B-N illustrated in FIG. 1. The DC voltage converter 202B includes an input 202Ba, a DC-DC voltage converter 202Bx, at least one DC electrical parameter sensor(s) 202By, and an output 202Bb. The input 202Ba of the DC voltage converter 102B is electrically coupled to an input of the DC-DC voltage converter 202Bx. Optionally, the DC-DC voltage converter is a boost voltage converter or a buck-boost voltage converter. An output of the DC-DC voltage converter 202Bx is coupled, e.g., magnetically or electrically, to each of at least one DC electrical parameter sensor (DC electrical parameter sensor(s)) 202By. Optionally, the DC electrical parameter sensor(s) 202By includes a current sensor and/or a voltage sensor. The output 102Bb of the DC voltage converter 102B is electrically coupled to the output of the DC-DC voltage converter 202Bx.

Figure 3:
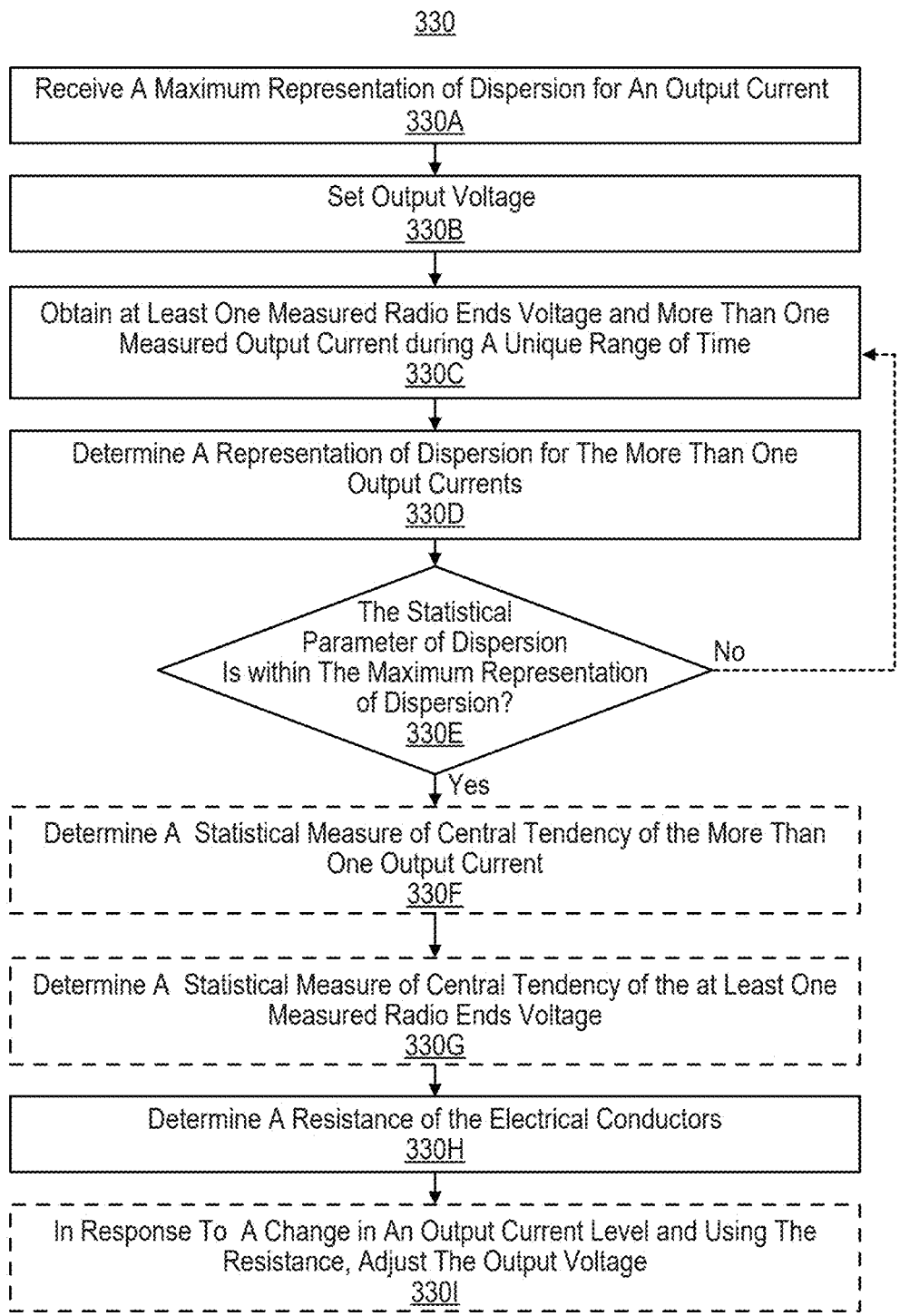
FIG. 3 illustrates a flow diagram of one embodiment of a method of determining a value of a resistance of electrical conductors electrically coupling an output of the DC voltage converter to a DC power input of a radio.

FIG. 3 illustrates a flow diagram of one embodiment of a method 330 of determining a value of a resistance of electrical conductors electrically coupling an output of the DC voltage converter to a DC power input of a radio. The methods illustrated with respect to FIG. 3 may be implemented with, e.g., the processing system 102A of, the DC-DC voltage converter system 102 illustrated and described with respect to FIGS. 1 and 2 but may be implemented with other systems as well. For pedagogical purposes, implementation of the methods is described with respect to FIGS. 1 and 2 and pertains to the first embodiment described above. Optionally, this method may be implemented with a measurement sensor, a feedback connection, a physical or logical feedback port, and optionally a data combiner.

The blocks of the flow diagrams have been arranged in a generally sequential manner for ease of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner).

In block 330A, a maximum representation of dispersion of an output current is obtained. Optionally, the maximum representation of dispersion may be in terms of a variance, a standard deviation, a numerical range, or any other parameter(s) characterizing dispersion of output current. Optionally, the maximum representation of dispersion is range of one ampere. Optionally, a voltage level is also obtained, where the voltage level is configured to be provided at the output of the DC converter and to provide the output current when the DC power input of the radio is drawing a constant power level, e.g., a relatively low power level when the radio is in a startup mode or a receive only mode. Optionally, a time period is further obtained; optionally, the time period is equal to or greater than a time period between radio ends voltage measurements. Optionally, the maximum representation of dispersion of output current and/or the time period are obtained from a register or through data input circuitry described elsewhere herein.

In block 330B, the output voltage is set to an output voltage level. In block 330C, at least one measured radio ends voltage and the more than one measured output currents are obtained, e.g., during a unique range of time lasting for the time period.[2, 3] Optionally, the time period is one, two, three, or more seconds. Optionally, the voltage level is measured at the output, e.g., of the DC voltage converter. Each output voltage may be determined from a measurement or a setting used to set the output voltage level at the output, e.g., of the DC voltage converter. Each output current is measured flowing from an output, e.g., of the DC voltage converter. Each radio end voltage is measured at radio ends of the electrical conductors, e.g., with a measurement sensor. When all output currents are measured, the output voltage(s) and the measured radio ends voltage(s) need to remain constant, e.g., substantially constant, for a resistance of the electrical conductors to be accurately determined.

[2] Optionally, the output voltage, when measured, and the measured output current are each measured at an output of a DC voltage converter described elsewhere herein.

[3] For example, the time period may be one second and the unique range of time is from twelve noon to twelve noon and one second; another unique range of time is from twelve noon and one second to twelve noon and two seconds.

Because there is a higher latency to receive the measured radio ends voltage(s) which is remote from the DC voltage converter, the measured radio ends voltage(s) may be measured more infrequently that the each output current measurement (and optionally output voltage measurement). Thus, two or more output current measurements (and optionally two or more output voltage measurements) may be obtained during a period between radio ends voltage measurements.

In block 330D, a representation of dispersion of the more than one measured output currents is determined. Optionally, the representation of dispersion is of a same form as the maximum representation of dispersion.

In block 330E, whether the representation of dispersion of the more than one measured output currents is within a maximum representation of dispersion of the output current is determined. Optionally, if the maximum representation of dispersion is a single value, e.g., a variance or a standard deviation, then block 330E may be implemented by determining whether the representation of dispersion of the more than one measured output currents is less than or equal to the maximum representation of dispersion of output current. Optionally, if the maximum representation of dispersion is a range, e.g., a minimum output current value and a maximum output current value, then block 330F may be implemented by determining whether the representation of dispersion of the more than one measured output currents is within the maximum representation of dispersion of the test output current, e.g., within the range set by a minimum value and a maximum value.

If the representation of dispersion of the more than one measured output currents is not within the maximum representation of dispersion of output current, then optionally proceed to block 330C. If the representation of dispersion of the more than one output current is within the maximum representation of dispersion of output current, then proceed to one of optional blocks 330F or 330G, or to block 330I.

In optional block 330F, a statistical measure of central tendency of the more than one measured output currents is determined. Optionally, the statistical measure of central tendency may be a mean, a median, or a mode. In optional block 330G, a statistical measure of central tendency of the at least one measured radio ends voltage is determined.

In block 330H, a resistance of the electrical conductors is determined. The resistance of the electrical conductors, Re, equals:

$$(V'o - V're)/I'o,$$

where V're is a representation of the at least one measured radio ends voltage and is either (a) one of the at least one measured radio ends voltage, e.g., measured during a unique time period, or (b) the statistical measure of central tendency of the at least one measured radio ends voltage, e.g., measured during the unique time period, V'o is the output voltage, and I'o is a representation of the at least one measured output currents and is either (a) one of the at least one measured output currents, e.g., measured during the unique time period, or (b) the statistical measure of central tendency of the at least one measured output currents, e.g., measured during the unique time period.

In optional block 330I, using the resistance of the electrical conductors and in response to a change in a measured output current level, a level of the output voltage is adjusted. Once the resistance of the electrical conductors has been determined, then the radio ends voltage measurements are no longer needed to diminish power dissipation in the electrical conductors. Optionally, the output voltage may be adjusted by an amount proportional to, e.g., equal to, a change in a voltage drop across the electrical conductors from the converter ends to the radio ends. The voltage drop across the electrical conductors may be determined by multiplying a measured output current by the resistance of the electrical conductors. Thus, the adjustment to the output voltage, e.g., of a DC voltage converter, is a function of, e.g., equals, the change voltage drop across the electrical conductors; such change in voltage drop across the electrical conductors is equal to a change in the measured output current multiplied by the resistance of the electrical conductors.

Figure 4:
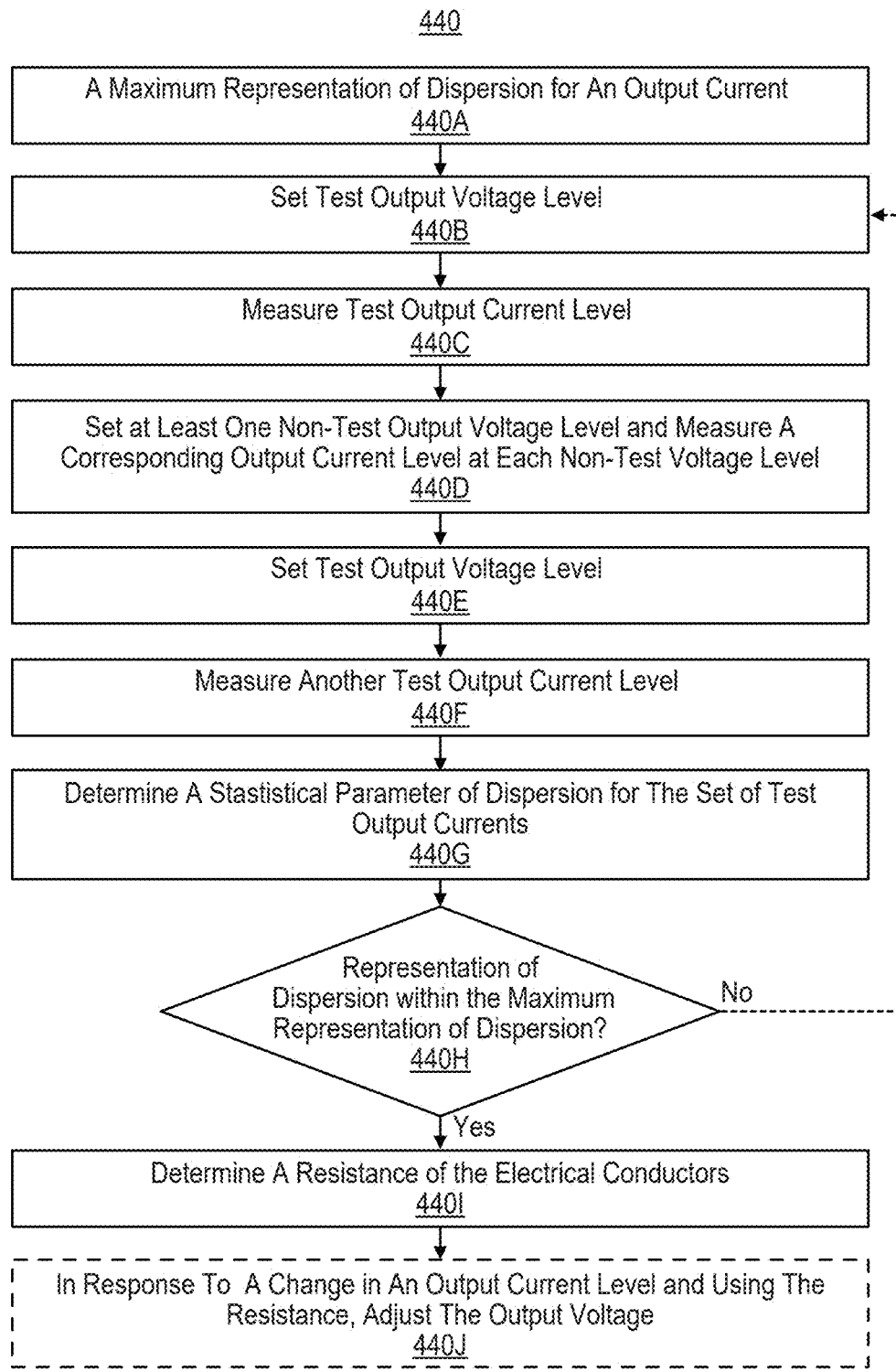
FIG. 4 illustrates a flow diagram of another embodiment of a method of determining a value of a resistance of electrical conductors electrically coupling an output of the DC voltage converter to a DC power input of a radio.

FIG. 4 illustrates a flow diagram of another embodiment of a method 440 of determining a value of a resistance of electrical conductors electrically coupling an output of the DC voltage converter to a DC power input of a radio. The methods illustrated with respect to FIG. 4 may be implemented with, e.g., the processing system 102A of, the DC-DC voltage converter system 102 illustrated and described with respect to FIGS. 1 and 2 but may be implemented with other systems as well. Because method 440 does not utilize a voltage measured at the radio ends of the of the electrical conductors, method 440 may be implemented with a apparatus like that illustrated in FIG. 1 but lacking measurement sensor(s), a data combiner, feedback connection(s), and feedback ports. For pedagogical purposes, implementation of the methods is described with respect to FIGS. 1 and 2 and pertains to the second embodiment described above.

The blocks of the flow diagrams have been arranged in a generally sequential manner for ease of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner).

In block 440A, a maximum representation of dispersion of a test output current is obtained. Optionally, the maximum representation of dispersion may be in terms of a variance, a standard deviation, a numerical range, or any other parameter(s) characterizing dispersion of output current. Optionally, a test output voltage is also obtained, where the test output voltage provides a test output current when the DC power input of the radio is drawing a constant power level, e.g., a relatively low power level when the radio is in a startup mode or a receive only mode. Optionally, a time period is further obtained. Optionally, the maximum representation of dispersion of the test output current and/or the time period are obtained from a register or through data input circuitry described elsewhere herein.

In block 440B, a test output voltage is set, e.g., at the output of the DC voltage converter. In block 440C, a test output current is measured, e.g., flowing from the output of the DC voltage converter, when the test output voltage level is set, e.g., at the output of the DC voltage converter. Optionally, the test output current is associated with the test output voltage.

In block 440D, at least one non-test output voltage level is set, e.g., at the output of the DC voltage converter, and a corresponding non-test output current is measured flowing from the output of the DC voltage converter and at each non-test output voltage level. Each corresponding non-test output current level is associated with the non-test output voltage level which was set when the corresponding non-test output current was measured. If more than one non-test output voltage is set, such settings are sequential. The non-test output voltage is different from the test output voltage. Optionally, at least two non-test output voltages are different, e.g., all non-test output voltages are different.

In block 440E, the test output voltage is again set, e.g., at the output of the DC voltage converter. In block 440F, another test output current is measured, e.g., flowing from the output of the DC voltage converter, when the test output voltage level is again set, e.g., at the output of the DC voltage converter. Optionally, the other test output current is associated with the test output voltage level.

Optionally, after block 440F, blocks 440D-440F may be repeated more than once. Thus, a set of at least two test output currents is obtained, e.g., including the test output current, the other test output current, and optionally any additional test output currents which are measured.

Then, in block 440G, a representation of dispersion of the set of test output currents is determined. The representation of dispersion may be in terms of a can be a variance, a standard deviation, a numerical range, or any other parameter(s) characterizing dispersion of the set of test output currents.

In block 440H, whether the representation of dispersion of the test output currents is within the maximum representation of dispersion of the set of test output currents is determined. Optionally, if the maximum representation of dispersion is a single value, e.g., a variance or a standard deviation, then block 440H may be implemented by determining whether the representation of dispersion of the set of test output currents is less than or equal to the maximum representation of dispersion of the set of test output currents. Optionally, if the maximum representation of dispersion is a range, e.g., a minimum test output current value and a maximum test output current value, then block 440H may be implemented by determining whether the representation of dispersion of the set of test output currents is within the maximum representation of dispersion of the test output current, e.g., within the range set by the minimum value and the maximum value.

If the representation of dispersion of the test output currents is not within the maximum representation of dispersion of output current, then optionally proceed to block 440B. If the representation of dispersion of test output currents is within the maximum representation of dispersion of test output currents, then proceed to block 440I.

In block 440I, a resistance of the electrical conductors is determined. The resistance of the electrical conductors, Re, equals:

$$\sum_{n=1}^{n=X'} \left[ (V_{O,n+1} * I_{O,n+1} - V_{O,n} * I_{O,n}) / (I_{O,n+1}^2 - I_{O,n}^2) \right] / X',$$

where $V_{O,n}$ is an output voltage of a nth voltage and current pair measured during a nth time or time period, $I_{O,n}$ is an output current measured when $V_{O,n}$ is the output voltage of the DC voltage converter, $V_{O,n+1}$ is an output voltage $V_O$ of a n+1 voltage and current pair measured during an n+1 time or time period, $I_{O,n+1}$ is an output current $I_O$ measured when $V_{O,n+1}$ is the output voltage of the DC voltage converter, and $X'$ is a number of pairs output voltages and output currents and is an integer greater than 1, wherein an output voltage of an nth voltage and current pair and an output voltage of a n+1 voltage and current pair are different, and a output current of the nth voltage and current pair and an output current of the n+1 voltage and current pair are different. Optionally, an output voltage of an nth pair and an output voltage of a n+1 pair re different, and a output current of the nth pair and an output current of the n+1 pair are different. Optionally, each of the X' pairs have different voltage and current levels. Pairs of $V_{On}$ and $I_{On}$ include at least one non-test output voltage and a corresponding non-test output current described with respect to block 440D. The second pair of $V_{On}$ and $I_{On}$ includes the test voltage and a corresponding test current measured when the test voltage was set or another non-test output voltage and a corresponding non-test output current.

In optional block 440J, using the resistance of the electrical conductors and in response to a change in a measured output current level, a level of the output voltage is adjusted. Once the resistance of the electrical conductors has been determined, then the radio ends voltage measurements are no longer needed to diminish power dissipation in the electrical conductors. Optionally, the output voltage may be adjusted by an amount proportional to, e.g., equal to, a change in a voltage drop across the electrical conductors from the converter ends to the radio ends. The voltage drop across the electrical conductors may be determined by multiplying a measured output current by the resistance of the electrical conductors. Thus, the adjustment to the output voltage, e.g., of a DC voltage converter, is a function of, e.g., equals, the change voltage drop across the electrical conductors; such change in voltage drop across the electrical conductors is equal to a change in the measured output current multiplied by the resistance of the electrical conductors.

The processing system (or processing circuitry) disclosed herein may comprise state machines, neural network, and/or other types of computing systems. Such processing system may comprise processing circuitry coupled to memory circuitry. The processing circuitry may include one or more microprocessors, microcontrollers, digital signal processing (DSP) elements, application-specific integrated circuits (ASICs), and/or field programmable gate arrays (FPGAs). The processor system may include or function with software programs, firmware, or other computer readable instructions, e.g., stored in the memory circuitry, for carrying out various process tasks, calculations, and control functions, used in the methods described herein. These instructions are typically tangibly embodied on any storage media (or computer readable medium) used for storage of computer readable instructions or data structures.

The memory circuitry can be implemented with any available storage media (or computer readable medium) that can be accessed by a general purpose or special purpose computer or processor, or any programmable logic device. Suitable computer readable medium may include storage or memory media such as semiconductor, magnetic, and/or optical media. For example, computer readable media may include conventional hard disks, volatile or non-volatile media such as Random Access Memory (RAM) (including, but not limited to, Dynamic Random Access Memory (DRAM)), Read Only Memory (ROM), Electrically Erasable Programmable ROM (EEPROM), and/or flash memory.

Methods of the invention can be implemented in computer readable instructions, such as program modules or applications, which may be stored in the computer readable medium and executed by the processing circuitry. Generally, program modules or applications include routines, programs, objects, data components, data structures, algorithms, and the like, which perform particular tasks or implement particular abstract data types.

Example Embodiments

Example 1 includes a method for determining a resistance of electrical conductors through which electrical power is provided by a direct current (DC) voltage converter to a DC power input of a radio, wherein the electrical conductors have converter ends and radio ends, and wherein output current flows from the converter ends to the radio ends, the method comprising: obtaining a maximum representation of dispersion of the output current; setting an output voltage to an output voltage level; obtaining at least one measured radio ends voltage level and more than one measured output current levels; determining a representation of dispersion of the more than one measured output current levels; determining whether the representation of dispersion of the more than one measured output current levels is within the maximum representation of dispersion of the output current; and determining that the representation of dispersion of the more than one measured output current levels is within the maximum representation of dispersion of the output current, then using a representation of a radio end voltage level, the output voltage level, and a representation of the more than one measured output current levels, determining the resistance of the electrical conductors.

Example 2 includes the method of Example 1, further comprising using the resistance of the electrical conductors and in response to a change in a measured output current level, adjusting a level of the output voltage.

Example 3 includes the method of Example 2, wherein adjusting the level of the output voltage comprises adjusting the level of the output voltage by an amount proportional to a change in a voltage drop across the electrical conductors.

Example 4 includes the method of any of Examples 1-3, wherein the representation of dispersion is a variance or a standard deviation; wherein determining whether the representation of dispersion of the more than one measured output current levels is within the maximum representation of dispersion of the output current comprises determining whether the variance or the standard deviation of the more than one measured output current levels is less than or equal to respectively a maximum variance or a maximum standard deviation of the more than one measured output current levels; wherein determining that the representation of dispersion of the more than one measured output current levels is within the maximum representation of dispersion of the output current comprises determining that respectively the variance or the standard deviation of the more than one measured output current levels is less than or equal to respectively the maximum variance or the maximum standard deviation of the output current.

Example 5 includes the method of any of Examples 1-4, further comprising determining a statistical measure of central tendency of the at least one measured radio ends voltage level; wherein the representation of the radio end voltage level is the statistical measure of central tendency of the at least one measured radio ends voltage level.

Example 6 includes the method of any of Examples 1-5, further comprising determining a statistical measure of central tendency of the more than one measured output current levels; wherein the representation of the more than one measured output current levels is the statistical measure of central tendency of the more than one measured output current levels.

Example 7 includes the method of any of Examples 1-6, wherein determining the resistance of the electrical conductors comprises determining the resistance of the electrical conductors from: (V'o−V're)/I'o, where V're is a representation of at least one measured radio ends voltage and is either (a) one of at least one measured radio ends voltage measured during a unique time period, or (b) a statistical measure of central tendency of the at least one measured radio ends voltage measured during the unique time period, V'o is the output voltage, and I'o is a representation of at least one measured output currents and is either (a) one of at least one measured output currents measured during the unique time period, or (b) a statistical measure of central tendency of the at least one measured output currents measured during the unique time period.

Example 8 includes a non-transitory computer readable medium storing a program causing at least one processor to execute a process for determining a resistance of electrical conductors through which electrical power is provided by a direct current (DC) voltage converter to a DC power input of a radio, wherein the electrical conductors have converter ends and radio ends, and wherein output current flows from the converter ends to the radio ends, the process comprising: obtaining a maximum representation of dispersion of the output current; causing an output voltage to be set to an output voltage level; obtaining at least one measured radio ends voltage level and more than one measured output current levels; determining a representation of dispersion of the more than one measured output current levels; determining whether the representation of dispersion of the more than one measured output current levels is within the maximum representation of dispersion of the output current; and determining that the representation of dispersion of the more than one measured output current levels is within the maximum representation of dispersion of the output current, then using a representation of a radio end voltage level, the output voltage level, and a representation of the more than one measured output current levels, determining the resistance of the electrical conductors.

Example 9 includes the non-transitory computer readable medium of Example 8, wherein the process further comprises, using the resistance of the electrical conductors and in response to a change in a measured output current level, adjusting a level of the output voltage.

Example 10 includes the non-transitory computer readable medium of Example 9, wherein adjusting the level of the output voltage comprises adjusting the level of the output voltage by an amount proportional to a change in a voltage drop across the electrical conductors.

Example 11 includes the non-transitory computer readable medium of any of Examples 8-10, wherein the representation of dispersion is a variance or a standard deviation; wherein determining whether the representation of dispersion of the more than one measured output current levels is within the maximum representation of dispersion of the output current comprises determining whether the variance or the standard deviation of the more than one measured output current levels is less than or equal to respectively a maximum variance or a maximum standard deviation of the more than one measured output current levels; wherein determining that the representation of dispersion of the more than one measured output current levels is within the maximum representation of dispersion of the output current comprises determining that respectively the variance or the standard deviation of the more than one measured output current levels is less than or equal to respectively the maximum variance or the maximum standard deviation of the output current.

Example 12 includes the non-transitory computer readable medium of any of Examples 8-11, wherein the process further comprises determining a statistical measure of central tendency of the at least one measured radio ends voltage level; wherein the representation of the radio end voltage level is the statistical measure of central tendency of the at least one measured radio ends voltage level.

Example 13 includes the non-transitory computer readable medium of any of Examples 8-12, wherein the process further comprises determining a statistical measure of central tendency of the more than one measured output current levels; wherein the representation of the more than one measured output current levels is the statistical measure of central tendency of the more than one measured output current levels.

Example 14 includes the non-transitory computer readable medium of any of Examples 8-13, wherein determining the resistance of the electrical conductors comprises determining the resistance of the electrical conductors from: (V'o−V're)/I'o, where V're is a representation of at least one measured radio ends voltage and is either (a) one of at least one measured radio ends voltage measured during a unique time period, or (b) a statistical measure of central tendency of the at least one measured radio ends voltage measured during the unique time period, V'o is the output voltage, and I'o is a representation of at least one measured output currents and is either (a) one of at least one measured output currents measured during the unique time period, or (b) a statistical measure of central tendency of the at least one measured output currents measured during the unique time period.

Example 15 includes an apparatus for determining a resistance of electrical conductors through which electrical power is provided by a direct current (DC) voltage converter to a DC power input of a radio, wherein the electrical conductors have converter ends and radio ends, and wherein output current flows from the converter ends to the radio ends, the apparatus comprising: processing circuitry; and at least one DC voltage converter communicatively coupled to the processing circuitry; wherein each DC voltage converter comprises a DC-DC voltage converter electrically coupled to a current sensor configured to measure direct current flowing through an output of the DC voltage converter; wherein the processing circuitry is configured to: obtain a maximum representation of dispersion of the output current; cause an output voltage of a DC voltage converter to be set to an output voltage level; obtain more than one measured output current levels from the current sensor of the DC voltage converter and at least one measured radio ends voltage level; determine a representation of dispersion of the more than one measured output current levels; determine whether the representation of dispersion of the more than one measured output current levels is within the maximum representation of dispersion of the output current; and determine that the representation of dispersion of the more than one measured output current levels is within the maximum representation of dispersion of the output current, then using a representation of a radio end voltage level, the output voltage level, and a representation of the more than one measured output current levels, determine the resistance of the electrical conductors.

Example 16 includes the apparatus of Example 15, wherein the processing circuitry is further configured to, using the resistance of the electrical conductors and in response to a change in a measured output current level, adjust a level of the output voltage.

Example 17 includes the apparatus of Example 16, wherein adjusting the level of the output voltage comprises adjusting the level of the output voltage by an amount proportional to a change in a voltage drop across the electrical conductors.

Example 18 includes the apparatus of any of Examples 15-17, wherein the representation of dispersion is a variance or a standard deviation; wherein determine whether the representation of dispersion of the more than one measured output current levels is within the maximum representation of dispersion of the output current comprises determine whether the variance or the standard deviation of the more than one measured output current levels is less than or equal to respectively a maximum variance or a maximum standard deviation of the more than one measured output current levels; wherein determine that the representation of dispersion of the more than one measured output current levels is within the maximum representation of dispersion of the output current comprises determine that respectively the variance or the standard deviation of the more than one measured output current levels is less than or equal to respectively the maximum variance or the maximum standard deviation of the output current.

Example 19 includes the apparatus of any of Examples 15-18, wherein the processing circuitry is further configured to determine a statistical measure of central tendency of the at least one measured radio ends voltage level; wherein the representation of the radio end voltage level is the statistical measure of central tendency of the at least one measured radio ends voltage level.

Example 20 includes the apparatus of any of Examples 15-19, wherein the processing circuitry is further configured to determine a statistical measure of central tendency of the more than one measured output current levels; wherein the representation of the more than one measured output current levels is the statistical measure of central tendency of the more than one measured output current levels.

Example 21 includes the apparatus of any of Examples 15-20, wherein determine the resistance of the electrical conductors comprises determine the resistance of the electrical conductors from: $(V'o - V're)/I'o$, where $V're$ is a representation of at least one measured radio ends voltage and is either (a) one of at least one measured radio ends voltage measured during a unique time period, or (b) a statistical measure of central tendency of the at least one measured radio ends voltage measured during the unique time period, $V'o$ is the output voltage, and $I'o$ is a representation of at least one measured output currents and is either (a) one of at least one measured output currents measured during the unique time period, or (b) a statistical measure of central tendency of the at least one measured output currents measured during the unique time period.

Example 22 includes a method for determining a resistance of electrical conductors through which electrical power is provided by a direct current (DC) voltage converter to a DC power input of a radio, wherein the electrical conductors have converter ends and radio ends, and wherein output current flows from the converter ends to the radio ends, the method comprising: obtaining a maximum representation of dispersion of a test output current; setting a test output voltage at an output of the of the DC voltage converter; when the test output voltage is set at the output of the DC voltage converter, measuring a test output current flowing from the output of the DC voltage converter; setting at least one non-test output voltage at the output of the DC voltage converter and measuring a corresponding non-test output current at each non-test output voltage and flowing from the output of the DC voltage converter; again setting the test output voltage at the output of the DC voltage converter; when the test output voltage is set at the output of the DC voltage converter, measuring another test output current flowing from the output of the DC voltage converter; determining a representation of dispersion of a set of test output currents; determining whether the representation of dispersion of the set of the test output currents is within the maximum representation of dispersion of the test output current; and determining that the representation of dispersion of the set of test output currents is within the maximum representation of dispersion of the test output current, then, using at least two voltage and current pairs, wherein each voltage and current pair comprises an output voltage at the output of the DC voltage converter and an output current occurring at the output voltage and flowing from the output of the DC voltage converter, determining the resistance of the electrical conductors, wherein at least one voltage and current pair is a non-test output voltage and a corresponding non-test output current at the non-test output voltage.

Example 23 includes the method of Example 22, wherein each non-test output voltage has a voltage level different from every other non-test output voltage.

Example 24 includes the method of any of Examples 22-23, wherein an output voltage of one voltage and current pair has a voltage level different from an output voltage of every other voltage and current pair.

Example 25 includes the method of any of Examples 22-24, wherein at least one other pair is the test output voltage and a corresponding test output current at the test output voltage.

Example 26 includes the method of any of Examples 22-25, wherein determining the resistance of the electrical conductors comprises determining the resistance of the electrical conductors from: $\sum_{n=1}^{n=X'}[(V_{O,\ n+1} * I_{O,\ n+1} - V_{O,\ n} * I_{O,\ n})/(I_{O,\ n+1}^2 - I_{O,\ n}^2)]/X'$, where $V_{O,\ n}$ is an output voltage of a nth voltage and current pair measured during a nth time or time period, $I_O$, n is an output current measured when $V_{O,n}$ is the output voltage of the DC voltage converter, $V_{O, n+1}$ is an output voltage $V_O$ of a n+1 voltage and current pair measured during an n+1 time or time period, $I_{O, n+1}$ is an output current $I_O$ measured when $V_{O, n+1}$ is the output voltage of the DC voltage converter, and X' is a number of pairs output voltages and output currents and is an integer greater than 1, wherein an output voltage of an nth voltage and current pair and an output voltage of a n+1 voltage and current pair are different, and a output current of the nth voltage and current pair and an output current of the n+1 voltage and current pair are different.

Example 27 includes the method of any of Examples 22-26, further comprising using the resistance of the electrical conductors and in response to a change in a measured output current level, adjusting a level of an output voltage.

Example 28 includes the method of Example 25, wherein adjusting the level of the output voltage comprises adjusting the level of the output voltage by an amount proportional to a change in a voltage drop across the electrical conductors.

Example 29 includes the method of any of Examples 22-28, wherein the representation of dispersion is a variance or a standard deviation; wherein determining whether the representation of dispersion of the set of test output currents is within the maximum representation of dispersion of the test output current comprises determining whether the variance or the standard deviation of the set of test output currents is less than or equal to respectively a maximum variance or a maximum standard deviation of test output current; wherein determining that the representation of dispersion of the set of test output currents is within the maximum representation of dispersion of the test output current comprises determining that respectively the variance or the standard deviation of the set of test output currents is less than or equal to respectively the maximum variance or the maximum standard deviation of the test output current.

Example 30 includes a non-transitory computer readable medium storing a program causing at least one processor to execute a process for determining a resistance of electrical conductors through which electrical power is provided by a direct current (DC) voltage converter to a DC power input of a radio, wherein the electrical conductors have converter ends and radio ends, and wherein output current flows from the converter ends to the radio ends, the process comprising: obtaining a maximum representation of dispersion of a test output current; causing a test output voltage to be set at an output of the DC voltage converter; when the test output voltage is set at the output of the DC voltage converter, measuring a test output current flowing from the output of the DC voltage converter; causing at least one non-test output voltage to be set again at the output of the DC voltage converter and measuring a corresponding non-test output current at each non-test output voltage and flowing from the output of the DC voltage converter; causing the test output voltage to again be set at the output of the DC voltage converter; when the test output voltage is set at the output of the DC voltage converter, measuring another test output current flowing from the output of the DC voltage converter; determining a representation of dispersion of a set of test output currents; determining whether the representation of dispersion of the set of the test output currents is within the maximum representation of dispersion of the test output current; and determining that the representation of dispersion of the set of test output currents is within the maximum representation of dispersion of the test output current, then, using at least two voltage and current pairs, wherein each voltage and current pair comprises an output voltage at the output of the DC voltage converter and an output current occurring at the output voltage and flowing from the output of the DC voltage converter, determining the resistance of the electrical conductors, wherein at least one voltage and current pair is a non-test output voltage and a corresponding non-test output current at the non-test output voltage.

Example 31 includes the non-transitory computer readable medium of Example 30, wherein each non-test output voltage has a voltage level different from every other non-test output voltage.

Example 32 includes the non-transitory computer readable medium of any of Examples 30-31, wherein an output voltage of one voltage and current pair has a voltage level different from an output voltage of every other voltage and current pair.

Example 33 includes the non-transitory computer readable medium of any of Examples 30-32, wherein at least one other pair is the test output voltage and a corresponding test output current at the test output voltage.

Example 34 includes the non-transitory computer readable medium of any of Examples 30-33, wherein determining the resistance of the electrical conductors comprises determining the resistance of the electrical conductors from: $\sum_{n=1}^{n=X'}[(V_{O, n+1} * I_{O, n+1} - V_{O, n} * I_{O, n})/(I_{O, n+1}^2 - I_{O, n}^2)]/X'$, where $V_O$, n is an output voltage of a nth voltage and current pair measured during a nth time or time period, $I_{O, n}$ is an output current measured when $V_{O, n}$ is the output voltage of the DC voltage converter, $V_{O, n+1}$ is an output voltage $V_O$ of a n+1 voltage and current pair measured during an n+1 time or time period, $I_{On+1}$ is an output current $I_O$ measured when $V_{O, n+1}$ is the output voltage of the DC voltage converter, and X' is a number of pairs output voltages and output currents and is an integer greater than 1, wherein an output voltage of an nth voltage and current pair and an output voltage of a n+1 voltage and current pair are different, and a output current of the nth voltage and current pair and an output current of the n+1 voltage and current pair are different.

Example 35 includes the non-transitory computer readable medium of any of Examples 30-34, wherein the process further comprises using the resistance of the electrical conductors and in response to a change in a measured output current level, adjusting a level of an output voltage.

Example 36 includes the non-transitory computer readable medium of any of Examples 30-35, wherein adjusting the level of the output voltage comprises adjusting the level of the output voltage by an amount proportional to a change in a voltage drop across the electrical conductors.

Example 37 includes the non-transitory computer readable medium of any of Examples 30-36, wherein the representation of dispersion is a variance or a standard deviation; wherein determining whether the representation of dispersion of the set of test output currents is within the maximum representation of dispersion of the test output current comprises determining whether the variance or the standard deviation of the set of test output currents is less than or equal to respectively a maximum variance or a maximum standard deviation of test output current; wherein determining that the representation of dispersion of the set of test output currents is within the maximum representation of dispersion of the test output current comprises determining that respectively the variance or the standard deviation of the set of test output currents is less than or equal to respectively the maximum variance or the maximum standard deviation of the test output current.

Example 38 includes an apparatus for determining a resistance of electrical conductors through which electrical power is provided by a direct current (DC) voltage converter to a DC power input of a radio, wherein the electrical conductors have converter ends and radio ends, and wherein output current flows from the converter ends to the radio ends, the apparatus comprising: processing circuitry; at least one DC voltage converter communicatively coupled to the processing circuitry; and wherein each DC voltage converter comprises a DC-DC voltage converter electrically coupled to a current sensor configured to measure direct current flowing through an output of the DC voltage converter; wherein the processing circuitry is configured to: obtain a maximum representation of dispersion of a test output current; cause a test output voltage to be set at the output of the DC voltage converter; when the test output voltage is set at the output of the DC voltage converter, measure a test output current flowing from the output of the DC voltage converter; cause at least one non-test output voltage to be set to a non-test output voltage level and measuring a corresponding non-test output current at each non-test output voltage level and flowing from the output of the DC voltage converter; cause the test output voltage to be set again at the output of the DC voltage converter; when the test output voltage is set at the output of the DC voltage converter, measure another test output current flowing from the output of the DC voltage converter; determining a representation of dispersion of a set of test output currents; determine whether the representation of dispersion of the set of the test output currents is within the maximum representation of dispersion of the test output current; and determining that the representation of dispersion of the set of test output currents is within the maximum representation of dispersion of the test output current, then, using at least two voltage and current pairs, wherein each voltage and current pair comprises an output voltage at the output of the DC voltage converter and an output current occurring at the output voltage and flowing from the output of the DC voltage converter, determining the resistance of the electrical conductors, wherein at least one voltage and current pair is a non-test output voltage and a corresponding non-test output current at the non-test output voltage.

Example 39 includes the apparatus of Example 38, wherein each non-test output voltage has a voltage level different from every other non-test output voltage.

Example 40 includes the apparatus of any of Examples 38-39, wherein an output voltage of one voltage and current pair has a voltage level different from an output voltage of every other voltage and current pair.

Example 41 includes the apparatus of any of Examples 38-40, wherein at least one other pair is the test output voltage and a corresponding test output current at the test output voltage.

Example 42 includes the apparatus of any of Examples 38-41, wherein determine the resistance of the electrical conductors comprises determine the resistance of the electrical conductors from: $\Sigma_{n=1}^{n=X'}[(V_{O,\ n+1}*I_{O,\ n+1}-V_{O,\ n}*I_{O,n})/(I_{O,n+1}^2-I_{O,n}^2)]/X'$, where $V_{O,\ n}$ is an output voltage of a nth voltage and current pair measured during a nth time or time period, $I_{O,\ n}$ is an output current measured when $V_{O,\ n}$ is the output voltage of the DC voltage converter, $V_{O,\ n+1}$ is an output voltage $V_O$ of a n+1 voltage and current pair measured during an n+1 time or time period, $I_{O,\ n+1}$ is an output current $I_O$ measured when $V_{O,\ n+1}$ is the output voltage of the DC voltage converter, and X' is a number of pairs output voltages and output currents and is an integer greater than 1, wherein an output voltage of an nth voltage and current pair and an output voltage of a n+1 voltage and current pair are different, and a output current of the nth voltage and current pair and an output current of the n+1 voltage and current pair are different.

Example 43 includes the apparatus of any of Examples 38-42, wherein the processing circuitry is further configured to, using the resistance of the electrical conductors and in response to a change in a measured output current level, adjust a level of an output voltage.

Example 44 includes the apparatus of Example 43, wherein adjust the level of the output voltage comprises adjust the level of the output voltage by an amount proportional to a change in a voltage drop across the electrical conductors.

Example 45 includes the apparatus of any of Examples 38-44, wherein the representation of dispersion is a variance or a standard deviation; wherein determining whether the representation of dispersion of the set of test output currents is within the maximum representation of dispersion of the test output current comprises determining whether the variance or the standard deviation of the set of test output currents is less than or equal to respectively a maximum variance or a maximum standard deviation of test output current; wherein determining that the representation of dispersion of the set of test output currents is within the maximum representation of dispersion of the test output current comprises determining that respectively the variance or the standard deviation of the set of test output currents is less than or equal to respectively the maximum variance or the maximum standard deviation of the test output current.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A method for determining a resistance of electrical conductors through which electrical power is provided by a direct current (DC) voltage converter to a DC power input of a radio, wherein the electrical conductors have converter ends and radio ends, and wherein output current flows from the converter ends to the radio ends, the method comprising:
  obtaining a maximum representation of dispersion of the output current;
  setting an output voltage to an output voltage level;
  obtaining at least one measured radio ends voltage level and more than one measured output current levels;
  determining a representation of dispersion of the more than one measured output current levels;
  determining whether the representation of dispersion of the more than one measured output current levels is within the maximum representation of dispersion of the output current; and
  determining that the representation of dispersion of the more than one measured output current levels is within the maximum representation of dispersion of the output current, then using a representation of a radio end voltage level, the output voltage level, and a representation of the more than one measured output current levels, determining the resistance of the electrical conductors.

2. The method of claim 1, further comprising using the resistance of the electrical conductors and in response to a change in a measured output current level, adjusting a level of the output voltage.

3. The method of claim 2, wherein adjusting the level of the output voltage comprises adjusting the level of the output voltage by an amount proportional to a change in a voltage drop across the electrical conductors.

4. The method of claim 1, wherein the representation of dispersion is a variance or a standard deviation;
   wherein determining whether the representation of dispersion of the more than one measured output current levels is within the maximum representation of dispersion of the output current comprises determining whether the variance or the standard deviation of the more than one measured output current levels is less than or equal to respectively a maximum variance or a maximum standard deviation of the more than one measured output current levels;
   wherein determining that the representation of dispersion of the more than one measured output current levels is within the maximum representation of dispersion of the output current comprises determining that respectively the variance or the standard deviation of the more than one measured output current levels is less than or equal to respectively the maximum variance or the maximum standard deviation of the output current.

5. The method of claim 1, further comprising determining a statistical measure of central tendency of the at least one measured radio ends voltage level;
   wherein the representation of the radio end voltage level is the statistical measure of central tendency of the at least one measured radio ends voltage level.

6. The method of claim 1, further comprising determining a statistical measure of central tendency of the more than one measured output current levels;
   wherein the representation of the more than one measured output current levels is the statistical measure of central tendency of the more than one measured output current levels.

7. The method of claim 1, wherein determining the resistance of the electrical conductors comprises determining the resistance of the electrical conductors from:

$$(V'o - V're)/I'o,$$

where V're is a representation of at least one measured radio ends voltage and is either (a) one of at least one measured radio ends voltage measured during a unique time period, or (b) a statistical measure of central tendency of the at least one measured radio ends voltage measured during the unique time period, V'o is the output voltage, and I'o is a representation of at least one measured output currents and is either (a) one of at least one measured output currents measured during the unique time period, or (b) a statistical measure of central tendency of the at least one measured output currents measured during the unique time period.

8. A non-transitory computer readable medium storing a program causing at least one processor to execute a process for determining a resistance of electrical conductors through which electrical power is provided by a direct current (DC) voltage converter to a DC power input of a radio, wherein the electrical conductors have converter ends and radio ends, and wherein output current flows from the converter ends to the radio ends, the process comprising:
   obtaining a maximum representation of dispersion of the output current;
   causing an output voltage to be set to an output voltage level;
   obtaining at least one measured radio ends voltage level and more than one measured output current levels;
   determining a representation of dispersion of the more than one measured output current levels;
   determining whether the representation of dispersion of the more than one measured output current levels is within the maximum representation of dispersion of the output current; and
   determining that the representation of dispersion of the more than one measured output current levels is within the maximum representation of dispersion of the output current, then using a representation of a radio end voltage level, the output voltage level, and a representation of the more than one measured output current levels, determining the resistance of the electrical conductors.

9. The non-transitory computer readable medium of claim 8, wherein the process further comprises, using the resistance of the electrical conductors and in response to a change in a measured output current level, adjusting a level of the output voltage.

10. The non-transitory computer readable medium of claim 9, wherein adjusting the level of the output voltage comprises adjusting the level of the output voltage by an amount proportional to a change in a voltage drop across the electrical conductors.

11. The non-transitory computer readable medium of claim 8, wherein the representation of dispersion is a variance or a standard deviation;
   wherein determining whether the representation of dispersion of the more than one measured output current levels is within the maximum representation of dispersion of the output current comprises determining whether the variance or the standard deviation of the more than one measured output current levels is less than or equal to respectively a maximum variance or a maximum standard deviation of the more than one measured output current levels;
   wherein determining that the representation of dispersion of the more than one measured output current levels is within the maximum representation of dispersion of the output current comprises determining that respectively the variance or the standard deviation of the more than one measured output current levels is less than or equal to respectively the maximum variance or the maximum standard deviation of the output current.

12. The non-transitory computer readable medium of claim 8, wherein the process further comprises determining a statistical measure of central tendency of the at least one measured radio ends voltage level;
   wherein the representation of the radio end voltage level is the statistical measure of central tendency of the at least one measured radio ends voltage level.

13. The non-transitory computer readable medium of claim 8, wherein the process further comprises determining a statistical measure of central tendency of the more than one measured output current levels;
   wherein the representation of the more than one measured output current levels is the statistical measure of central tendency of the more than one measured output current levels.

14. The non-transitory computer readable medium of claim 8, wherein determining the resistance of the electrical conductors comprises determining the resistance of the electrical conductors from:

$$(V'o - V're)/I'o,$$

where V're is a representation of at least one measured radio ends voltage and is either (a) one of at least one measured radio ends voltage measured during a unique time period, or (b) a statistical measure of central tendency of the at least one measured radio ends voltage measured during the unique time period, V'o is the output voltage, and I'o is a representation of at least one measured output currents and is either (a) one of at least one measured output currents measured during the unique time period, or (b) a statistical measure of central tendency of the at least one measured output currents measured during the unique time period.

15. An apparatus for determining a resistance of electrical conductors through which electrical power is provided by a direct current (DC) voltage converter to a DC power input of a radio, wherein the electrical conductors have converter ends and radio ends, and wherein output current flows from the converter ends to the radio ends, the apparatus comprising:
processing circuitry; and
at least one DC voltage converter communicatively coupled to the processing circuitry;
wherein each DC voltage converter comprises a DC-DC voltage converter electrically coupled to a current sensor configured to measure direct current flowing through an output of the DC voltage converter;
wherein the processing circuitry is configured to:
obtain a maximum representation of dispersion of the output current;
cause an output voltage of a DC voltage converter to be set to an output voltage level;
obtain more than one measured output current levels from the current sensor of the DC voltage converter and at least one measured radio ends voltage level;
determine a representation of dispersion of the more than one measured output current levels;
determine whether the representation of dispersion of the more than one measured output current levels is within the maximum representation of dispersion of the output current; and
determine that the representation of dispersion of the more than one measured output current levels is within the maximum representation of dispersion of the output current, then using a representation of a radio end voltage level, the output voltage level, and a representation of the more than one measured output current levels, determine the resistance of the electrical conductors.

16. The apparatus of claim 15, wherein the processing circuitry is further configured to, using the resistance of the electrical conductors and in response to a change in a measured output current level, adjust a level of the output voltage.

17. The apparatus of claim 16, wherein adjusting the level of the output voltage comprises adjusting the level of the output voltage by an amount proportional to a change in a voltage drop across the electrical conductors.

18. The apparatus of claim 15, wherein the representation of dispersion is a variance or a standard deviation;
wherein determine whether the representation of dispersion of the more than one measured output current levels is within the maximum representation of dispersion of the output current comprises determine whether the variance or the standard deviation of the more than one measured output current levels is less than or equal to respectively a maximum variance or a maximum standard deviation of the more than one measured output current levels;
wherein determine that the representation of dispersion of the more than one measured output current levels is within the maximum representation of dispersion of the output current comprises determine that respectively the variance or the standard deviation of the more than one measured output current levels is less than or equal to respectively the maximum variance or the maximum standard deviation of the output current.

19. The apparatus of claim 15, wherein the processing circuitry is further configured to determine a statistical measure of central tendency of the at least one measured radio ends voltage level;
wherein the representation of the radio end voltage level is the statistical measure of central tendency of the at least one measured radio ends voltage level.

20. The apparatus of claim 15, wherein the processing circuitry is further configured to determine a statistical measure of central tendency of the more than one measured output current levels;
wherein the representation of the more than one measured output current levels is the statistical measure of central tendency of the more than one measured output current levels.

21. The apparatus of claim 15, wherein determine the resistance of the electrical conductors comprises determine the resistance of the electrical conductors from:

$$(V'o - V're)/I'o,$$

where V're is a representation of at least one measured radio ends voltage and is either (a) one of at least one measured radio ends voltage measured during a unique time period, or (b) a statistical measure of central tendency of the at least one measured radio ends voltage measured during the unique time period, V'o is the output voltage, and I'o is a representation of at least one measured output currents and is either (a) one of at least one measured output currents measured during the unique time period, or (b) a statistical measure of central tendency of the at least one measured output currents measured during the unique time period.

* * * * *